United States Patent [19]
Paoli

[11] 3,913,174
[45] Oct. 21, 1975

[54] METHOD AND APPARATUS FOR REMOVING SKIN FROM CHICKEN NECKS

[76] Inventor: Stephen A. Paoli, 520 S. Sixth St., Rockford, Ill. 61108

[22] Filed: Oct. 5, 1973

[21] Appl. No.: 403,846

[52] U.S. Cl. .................................... 17/1 G; 17/11
[51] Int. Cl. .............................................. A22b
[58] Field of Search ........... 17/11, 1, 1 G; 146/76 R

[56] References Cited
UNITED STATES PATENTS
| | | | |
|---|---|---|---|
| 2,477,289 | 7/1949 | De Moss | 17/21 |
| 2,895,162 | 7/1959 | Harris | 17/1 G |

*Primary Examiner*—Robert Peshock

[57] ABSTRACT

A rotatable cylinder has a helical rib in its outer surface. A housing covers the cylinder and has an arcuate channel extending from an inlet at the top of the cylinder to an outlet. The housing has a plurality of grooves intersecting the bottom of the channel. In operation, the cylinder is driven by a motor and the rib feeds the necks along the channel while rotating the necks. The grooves provide an area into which the skin is forced. The lands between the grooves provide a surface against which the skin is pinched by the cylinder to strip the skin from the neck.

The method includes removing the skin from necks of chicken or other fowl by pinching the skin between two relatively moving surfaces, and moving the neck in a direction crosswise of said relative movement to remove the skin from the neck.

13 Claims, 8 Drawing Figures

METHOD AND APPARATUS FOR REMOVING SKIN FROM CHICKEN NECKS

BACKGROUND:

The field of art to which the invention pertains is that of food processing related to butchering. The invention pertains to processing fowl and, more particularly, to method and apparatus for skinning necks of chicken or other fowl.

In modern food processing, large quantities of comminuted meat are utilized in various food products. The desirability of automating the production has long been recognized and has been achieved to a great extent by my prior inventions relating to methods and machines for producing boneless comminuted meat. See, for example, U.S. Pat. Nos. 3,266,542 and 3,266,543, both issued Aug. 16, 1966 to Stephen A. Paoli. These prior methods and machines have been utilized for producing boneless comminuted meat from chicken and turkey necks. In so doing, the skin, bone and meat have been ground and then separated. Since the skin is flesh, it separates with the meat. If the skin is removed prior to grinding, a much higher grade of comminuted meat is achieved. It is desirable, therefore, to provide a method and apparatus for removing the skin from necks of chicken or other fowl prior to such grinding and separating.

SUMMARY:

The present invention relates to a method and apparatus for removing skin from the necks of chicken or other fowl.

It is a general object of the present invention to provide a method and apparatus for removing skin from chicken necks and the like in an easy, fast, and certain manner.

Another object of the invention is to provide an improved method of removing skin from chicken necks and the like, and to provide one apparatus for performing the method, which apparatus involves a minimum number of moving parts.

Yet another object is to provide a method of producing boneless comminuted meat from chicken necks and the like in which there is no skin in the resulting comminuted meat, thereby increasing the quality of the boneless comminuted meat obtained from chicken necks and the like.

Another object of the invention is to provide a machine for removing skin from chicken necks and the like and capable of operating automatically and continuously at higher production rates.

Still another object is to provide a machine in accordance with the preceding object in which a rotor is the only moving part other than the apparatus providing the motive force thereto.

Another object of the present invention is to provide a method and apparatus of the character described which will meet in all respects the high standards of sanitation required for meat processing.

These, and other objects and advantages of the present invention, will become apparent as the same becomes better understood from the following detailed description when taken in conjunction with the accompanying drawings.

Figure 1:
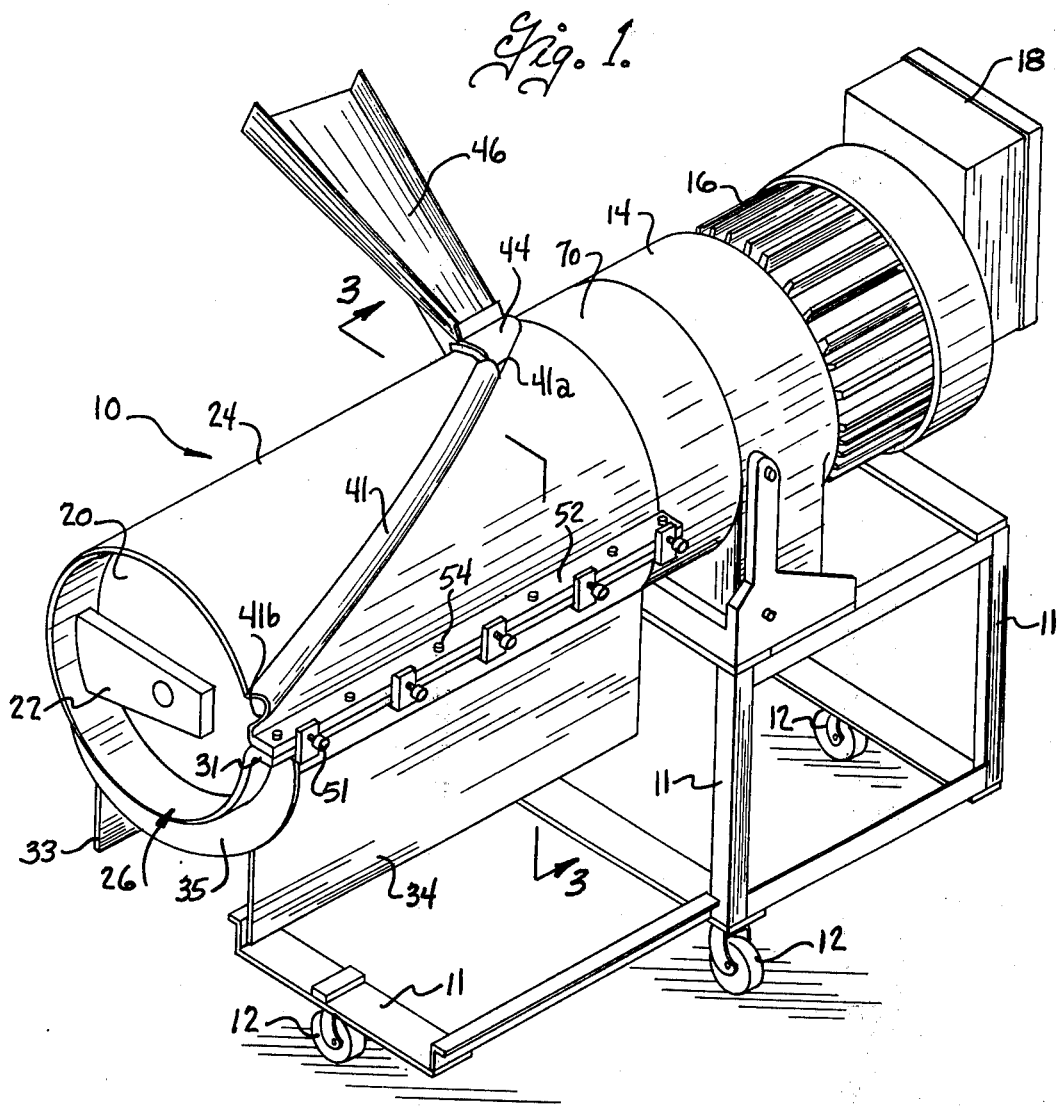
FIG. 1 is a perspective view of a machine for removing skin from chicken necks and the like, constructed in accordance with the present invention.

DESCRIPTION:

Reference is now made more particularly to the drawings which illustrate the best presently known mode of carrying out the invention and wherein similar reference characters indicate the same parts throughout the several views.

The apparatus for removing the skin S from necks N of chicken or other fowl, is embodied in a machine generally designated by the numeral 10 in FIG. 1. The machine 10 conveniently includes a base formed of a plurality of structural members 11 and mounted on a plurality of caster wheels 12. The base has a gear box 14 rigidly mounted thereon and which, in turn, supports a power unit 16 and control box 18 which are shown to the right of the gear box in FIG. 1. The power unit 16 is adapted to drive a rotor or drum 20 through the gear box 14; and the rotor 20 extends in cantilever fashion from the gear box to the left as seen in FIG. 1. The rotor 20 has its outer end journaled in a support 22, and the rotor is encased in a housing which includes an upper housing portion 24 and a lower housing portion 26.

Figure 3:
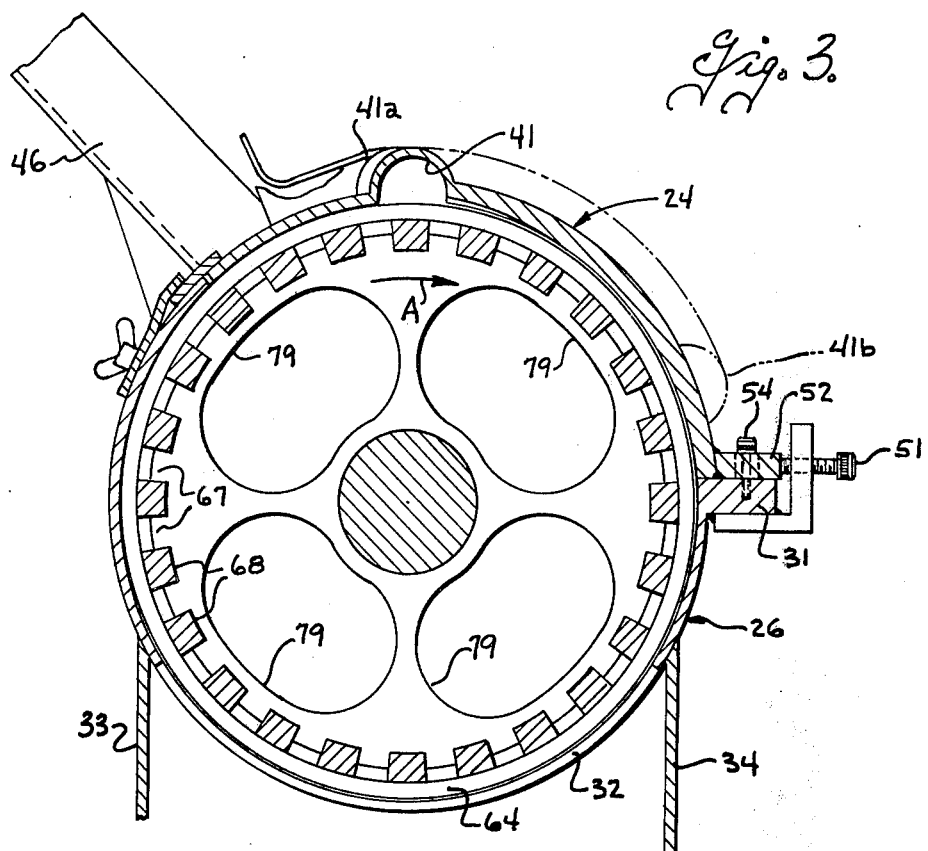
FIG. 3 is a cross-sectional view taken generally along line 3—3 of FIG. 1 and showing one embodiment of the internal construction of the machine.
Figure 6:
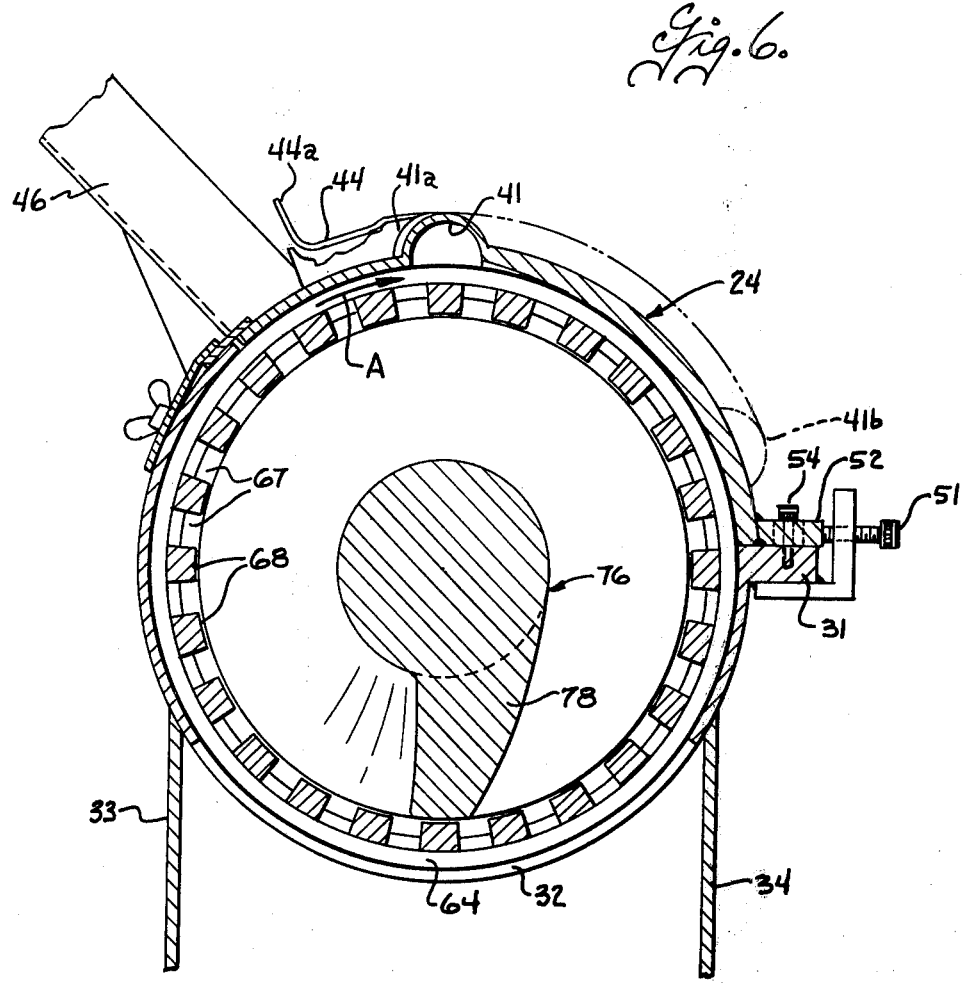
FIG. 6 is a cross-sectional view similar to FIG. 3, but showing another embodiment of the internal construction of the machine.

The lower housing portion 26 conveniently surrounds a major portion of the circumference of the rotor 20, as seen in FIGS. 3 and 6. At one longitudinal side of the lower housing 26 is a longitudinal extending support flange 31 upon which the upper housing 24 is adjustably mounted, as hereafter described. As can be seen in FIGS. 3 and 6, the lower housing has an opening 32 extending along a major portion of its length and through which the removed skins are dispensed. Depending aprons 33 and 34 extend longitudinally on opposite sides of the opening 32 to guide the discharged skins into a tray or other receiver (not shown) which may be conveniently supported on the base. To add rigidity to the lower housing 26, an arcuate support member 35 is provided at the cantilevered end, as shown in FIG. 1.

Figure 2:
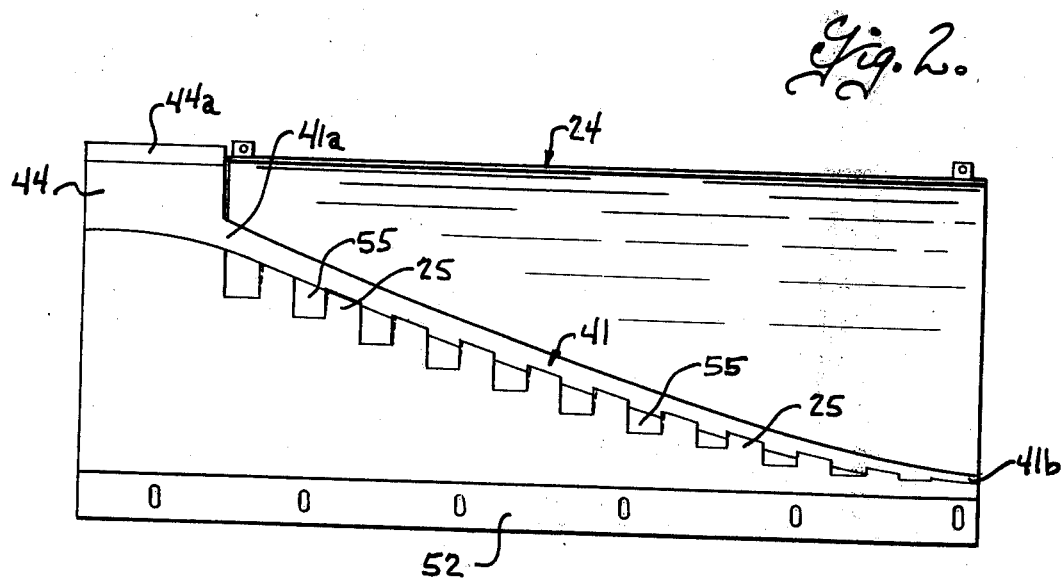
FIG. 2 is a plan view of the inside of the portion of the housing in which the neck-receiving channel is located.

An elevational view of the inside of the upper housing 24 is shown in FIG. 2. As can be seen, there is a longitudinally-extending channel 41 which has an open side facing the rotor 20. The channel has an inlet end 41a at one end of the rotor and, as can be seen in FIG. 1, this is adjacent the top of the rotor. An outlet end 41b is located at the opposite or cantilevered end of the rotor and adjacent one side thereof. The outlet end 41b is angularly spaced about 90° from the inlet end 41a. The channel 41 has a smooth inner surface, is semi-circular in cross-section, and is sized to closely receive a neck of a fowl. For chicken necks, the channel is about 1½ inches wide at the open side and about ¾ inches deep. At the inlet end 41a, the upper housing 24 has an opening into which the necks may be fed. For chicken necks, the opening may be 5 inches in length as measured longitudinally of the channel 41. A flap 44 overlies the opening and is arranged in spaced relation to the rotor 20. The spacing is preferably slightly less than the thickness of the necks being processed. The flap 44 is preferably formed of resilient metal so that the flap is resiliently mounted to urge a neck against the rotor 20 which then feeds it into the channel 41. The flap 44 has an upturned outer end 44a and a trough 46 is arranged to receive the necks and gravity feed them to the opening. The upturned end 44a overlies the lower end of the trough to aid in the feeding operation.

Figure 8:
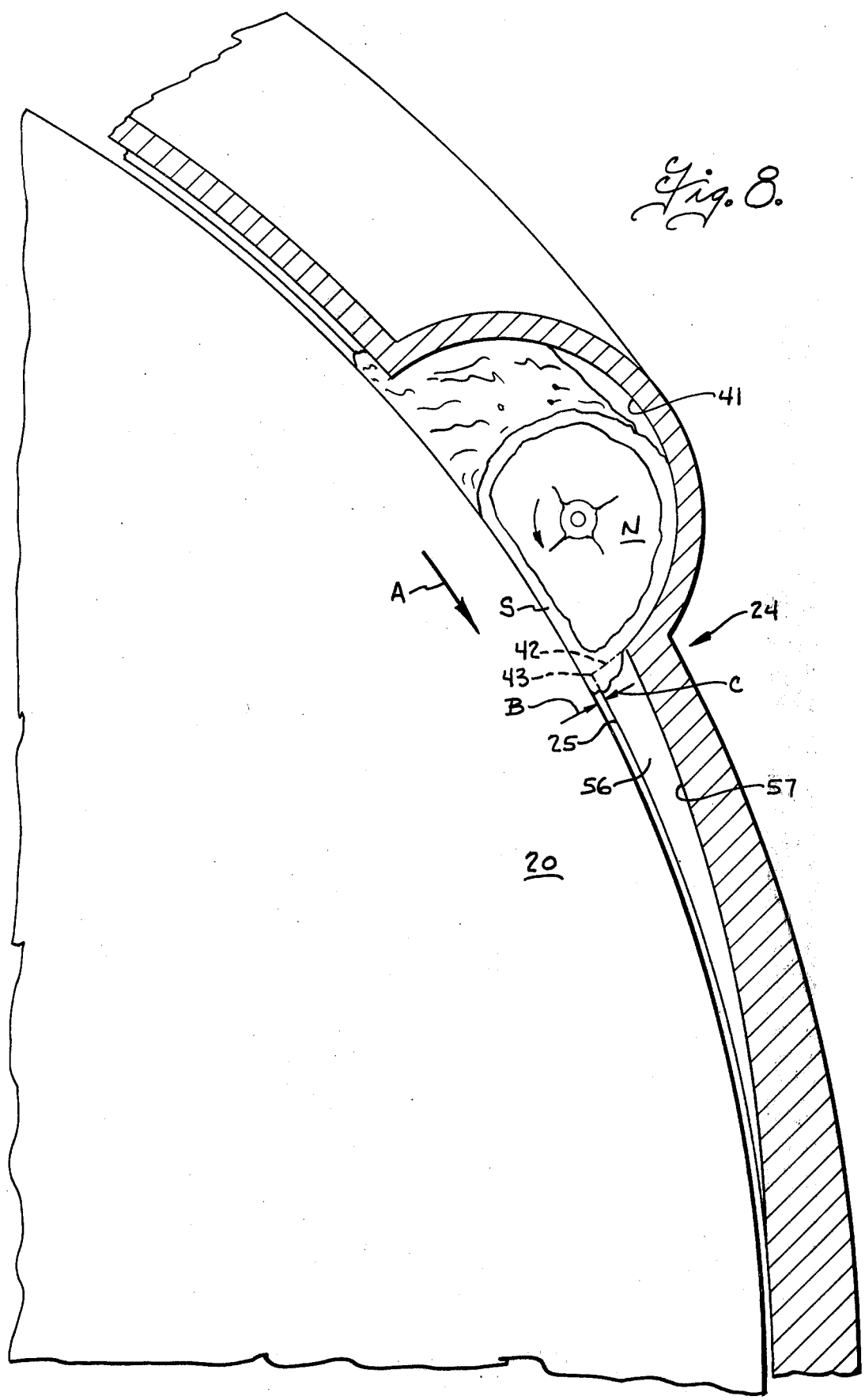
FIG. 8 is a greatly enlarged fragmentary view, with a diagrammatic illustration of the rotor and with the housing and channel in cross-section, and showing a chicken neck disposed in the channel.

In brief, the necks of a chicken or other fowl may be placed in the trough 46 and the power unit 16 started to start rotation of the rotor 20 in the direction of the arrow A shown in FIGS. 3, 6 and 8. The rotor has a helical rib (hereafter described) in its outer peripheral surface for feeding the necks longitudinally of the rotor as it is driven. The direction of rotation forces a neck under the flap 44, into the channel 41, and against the channel's lower surface 42 (sometimes referred to as third surface). The helical rib on the rotor then feeds the neck along the channel from the inlet end 41a to the outlet end 41b. While travelling this distance, the skin of the neck is forced over a sharp edge 43 (see FIGS. 5 and 8) and is pinched between the periphery of the rotor 20 (sometimes referred to as first surface) and the inside surface (sometimes referred to as second surface) of the upper housing 24. This second surface is the surface adjacent the bottom side of channel 41 and is indicated by the numeral 25 in FIGS. 2 and 8. It will be noted that second surface 25 is about perpendicular to third surface 42.

In the manner described above, the skin is pinched between two relatively moving surfaces. I have found that the distance between these two surfaces as indicated by arrows B and C in FIG. 8, should be less than the thickness of the skin being removed. As one example, about 15 thousandths of an inch is the approximate maximum width for removing the skin from chicken necks. This distance is adjustable by means of a plurality of bolts 51 bearing against the edge of a flange 52 on the upper housing 24. When the proper adjustment is achieved, a plurality of bolts 54, passing through slots in the flange 52 into flange 31, are tightened to secure the upper housing 24 in position.

Figure 5:
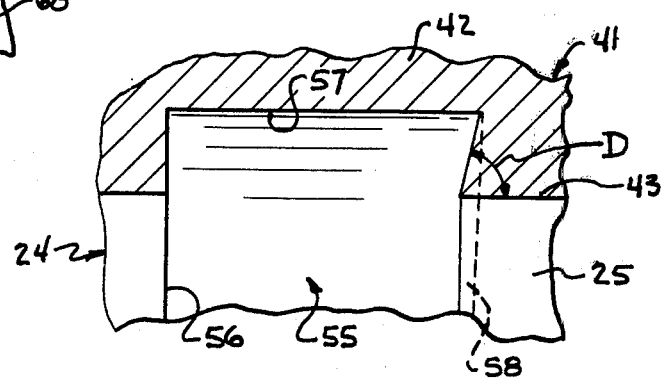
FIG. 5 is a fragmentary view, on a still larger scale, showing details of the grooves and lands on the inside of the housing.

It has been found that surface 25 can be smooth for the above-described pinching operation and that a high percentage of the skins S will be removed with such an arrangement. However, an even greater percentage of the skins are removed if the inside of the housing is provided with a plurality of grooves 55 on the inside thereof and intersecting the bottom of the channel 41. The grooves 55 are spaced to form stationary lands therebetween. The grooves are advantageously about 1¼ to 1½ inches wide and about ⅛ inch to ¼ inch deep, and the total of the widths of the grooves equals about one-half of the length of the channel 41. The grooves are preferably arranged along the full length of the channel for the highest efficiency. As best seen in FIG. 5, the grooves 55 have sides 56, 57 and 58. The side adjacent the outlet of the channel, namely side 58 is preferably undercut as shown in FIG. 5 to provide the adjacent surface 25 with an inlet facing surface at an acute angle as indicated at D. When grooves are provided, the remainder of surface 25 can be viewed as lands or as projections. It has been found that this arrangement provides still greater efficiency in removing skins from the neck and that with the arrangement described, substantially all skins are removed when necks are fed through the channel 41.

Figure 4:
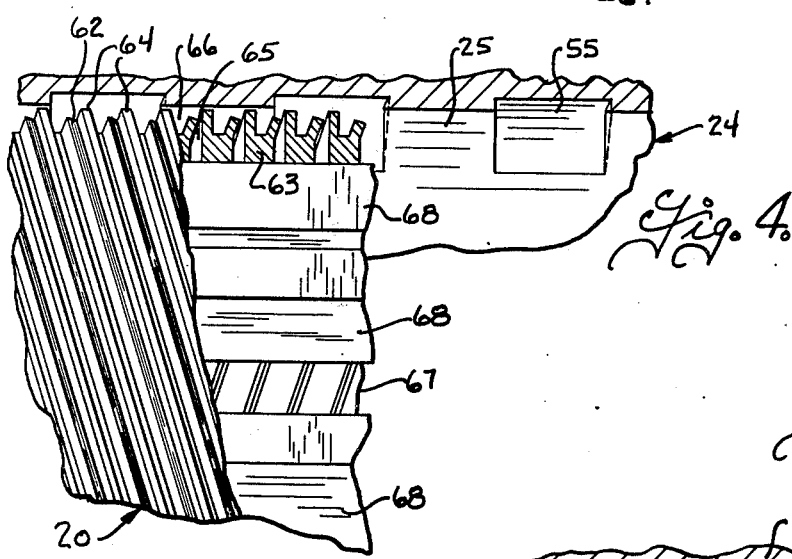
FIG. 4 is an enlarged fragmentary view, partly in elevation and partly in longitudinal section, showing the configuration of one embodiment of the rotor and the inner configuration of the housing.

Referring more specifically to FIGS. 3 and 4, it will be noted that the rotor 20 comprises elements 63 of generally helical form. The outermost peripheral faces of the elements 63 are provided with ribs 64. The outer surfaces or lands of the ribs 64 are smooth and define a circular cylinder. Each element 63 also includes a smaller canted rib 62 in this embodiment. As can be seen in FIG. 4, there is defined between each adjacent pair of elements 63 an open or through groove 65 communicating with the interior of the rotor, and a relatively shallow blind groove 66 between the rib 62 and rib 64 of each element 63. The elements 63 in this case are arranged in multiple helices, each having a pitch of one turn per eight inches, with eighty individual elements 63 starting at equal angular intervals about the circumference at one end of the rotor 20. This results in eight ribs 64 per inch of rotor length on the outer periphery of the rotor body. A greater or lessor pitch can be employed if desired. Thus it can be seen that a multiplicity of ribs 64 will engage a neck in the channel 41 and the helical disposition feeds the neck through the channel. It will be understood that the neck is rotated about its axis during the feeding operation. Thus the ribs move the neck N crosswise of the relative movement of the surfaces pinching the skin S to thereby remove the skin from the neck. It will be understood that the crosswise direction is parallel to the axis of the neck.

Each of the open grooves 65 is constricted adjacent the outer end of rib 62 and relieved adjacent the inner end of element 63. Underlying the skin of a neck of a fowl, is a thin layer of fat and this fat can pass through the groove 65 into the interior of the rotor 20. The interior of the rotor 20 is formed with a plurality of longitudinally extending slots 67, in this case twenty-four in number, each of a depth extending to the root diameter of the elements 63 and connected with the open grooves 65, as shown in FIG. 3. This defines a corresponding plurality of longitudinally extending lands 68 in the body to preserve its mechanical strength.

If desired, provision can be made for collecting and discharging the fat from the interior of the rotor 20 continuously and as an incident to rotation of the rotor. For this purpose an auger 76 (FIG. 6), having a helical flight 78, is fitted in relatively closely spaced relation with the inner faces of the lands 68. The auger is housed within the interior of the rotor 20 and is secured against rotation. Thus, as the rotor 20 rotates, relative movement will occur between the inner walls of the rotor body and the auger flight 78 tending to scrape the fat from the inside of the rotor and move it in a helical path following the flight 78. As will be appreciated, the helical direction of the flight 78 determines which may be fat will be moved. In this instance, it is adapted to direct the fat to the inlet end of the machine. To facilitate discharge of the product from the auger, the rotor 20 has a plurality of large sector shaped apertures 79, as shown in FIG. 3. The fat passes through these apertures, out of the rotor and into a discharge space 70 (see FIG. 1) between the gear box 14 and the rotor 20.

Another suitable construction of the rotor 20 is illustrated and described in U.S. Pat. No. 3,266,542, issued August 16, 1966 to the inventor of the present application. While the rotor in said patent was used for a widely different purpose than the present invention, it can be utilized in the combination of the present invention.

Figure 7:
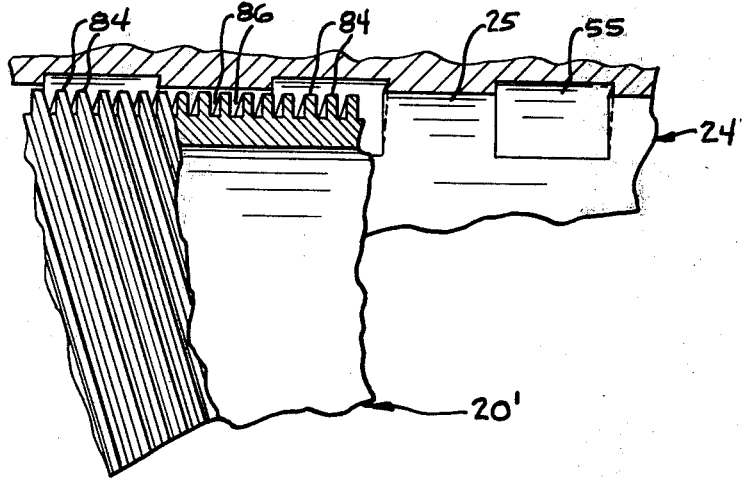
FIG. 7 is an enlarged fragmentary view, partly in elevation and partly in section, showing the configuration of another embodiment of the rotor.

Still another suitable rotor construction is shown in FIG. 7. There is illustrated a rotor 20' having a plurality of helical ribs 84 all of which are of identical size and shape and all extending to the rotor periphery. Because each two ribs is a groove 86 but, in this instance, each groove is a blind groove. Obviously no material passes into the interior of the rotor 20' and the rotor does not have any internal auger, such as shown in FIG. 6; nor is a discharge space 70 required with this embodiment. The helical ribs 84 are advantageously arranged in multiple helices, each having a pitch of one turn per 8 inches. There are 16 ribs 84 per ich of rotor length on the outer periphery of the rotor body.

In one suitable embodiment of the present invention, the rotor 20 or 20' has a diameter of 12.65 inches and a length of 36 inches. While I have utilized shorter rotors, I find this to be an exemplary length. Motor 16 is of a size sufficient to rotate the rotor 200 RPM, and for this purpose about 3 HP is sufficient.

The invention in its broader aspects is not limited to the specific steps and mechanism shown and described, but departures may be made therefrom within the scope of the accompanying claims without departing from the principles of the invention and without sacrificing its chief advantages.

The embodiments of the invention in which on exclusive property or privilege is claimed are defined as follows:

1. Apparatus for removing the skin from the neck of a chicken or other fowl and comprising: a fixed housing having a longitudinally-extending channel sized to receive the neck; rotatable; means adjacent the channel for engaging and rotating the neck and advancing it in one direction along the channel; and means located adjacent the channel for engaging the skin and removing it from the neck as the neck is advanced along the channel.

2. Apparatus according to claim 1 in which the channel has a smooth inner surface; and the last-mentioned means includes a sharp edge formed by said channel surface and a second surface generally perpendicular thereto.

3. Apparatus according to claim 1 in which the channel has a smooth inner surface; and the last-mentioned means is formed by a longitudinal surface at one edge of the channel surface and generally perpendicular to it, and another surface disposed crosswise of the channel and intersecting both the channel surface and the longitudinal surface, and said other surface facing opposite to said direction of advancing the neck and at an angle to said longitudinal surface.

4. A machine for skinning chicken necks and the like, comprising in combination: a support; a revolvable longitudinal member mounted on the support; a helical rib on the outer peripheral surface of said member; means for revolving said member and thereby moving the helical rib; a housing mounted on the suppprt closely adjacent a portion of the peripheral surface of said member; the housing having a longitudinally-extending channel therein sized to receive the chicken necks and having an open side facing said member so that the necks are engaged by the moving helical rib to advance the chicken necks in one direction along the channel; and means along the channel for engaging and removing the skins as the chicken necks are advanced along the channel.

5. A machine for skinning chicken necks and the like as set forth in claim 4 in which the channel has a generally smooth inner surface, and the last-mentioned means includes a surface at the bottom edge of the channel and adjacent the peripheral surface of said member but spaced therefrom a distance less than the thickness of the skin, whereby the skin is pinched between the two last-stated surfaces.

6. A machine for skinning chicken necks and the like as set forth in claim 4 including a plurality of projections spaced along the channel, the projection being formed by a plurality of grooves on the side of the housing adjacent the peripheral surface of said member and intersecting the bottom of the channel.

7. A machine for skinning chicken necks and the like as set forth in claim 6 in which the grooves form ribs therebetween, the grooves have a depth of up to about ¼ inch, the grooves have a side facing opposite to said one direction, and said side being undercut to provide the adjacent rib with an inlet-facing surface at an acute angle to said one direction.

8. A machine for skinning chicken necks and the like as set forth in claim 4 in which the longitudinal-extending channel has an inlet end at one end of the revolvable member adjacent the top thereof and an outlet and at the opposite end of the revolvable member and angularly spaced about 90° from the inlet end as measured in the direction of rotation of the revolvable member.

9. A machine for skinning chicken necks and the like as set forth in claim 8 including means for supplying the chicken necks to said opening; a flap overlying the opening in spaced relation to the revolvable member and the flap being resiliently mounted to urge a chicken neck against the revolvable member.

10. A machine for skinning chicken necks and the like as set forth in claim 4 wherein the helical rib on the outer peripheral surface of the revolvable member has a smooth, flat land; said lands defining a circular cylinder; and the helical rib being disposed in relatively closely spaced convolutions in said peripheral surface; the lands and the convolutions of the helical rib being so constructed and arranged that a plurality of lands contact the neck while in said channel.

11. A machine for removing the skin from chicken necks and the like, comprising in combination:
   a support;
   a hollow cylinder journaled on the support for rotation about its axis, the cylinder having at least one helical rib in the outer peripheral surface thereof and defining a plurality of helical grooves therein;

a housing mounted on the support closely adjacent a portion of the peripheral surface of the cylinder, the housing having a longitudinally-extending channel therein having an open side facing the cylinder, the channel having an inlet end at one end of the cylinder adjacent the top thereof and an outlet end at the opposite end of the cylinder adjacent one side thereof and angularly spaced about 90° from the inlet end, the channel having a semicircular cross-sectional shape and being about 1½ inches wide at the open side and about ¾ inches deep;

the housing having an opening at the inlet end of the channel and a flap overlying the opening, the flap being in spaced relation to the cylinder and resiliently mounted to urge a chicken neck against the cylinder, the flap having an inlet side facing the side of the cylinder opposite to the side at which the outlet end of the channel is disposed;

the housing having a plurality of grooves on the inside thereof and intersecting the bottom of the channel, the widths of the grooves total about one-half the length of the channel and forming stationary ribs therebetween, the grooves having sides with the side adjacent the outlet being undercut to provide the adjacent rib with an inlet-forming surface at an acute angle, means adjacent said flap for feeding the chicken necks to the housing opening; and means for rotating the cylinder in a direction such that the helical rib rotates the chicken necks and advances them from the inlet to the outlet of the channel, thereby contacting the skins with the stationary ribs and removing the same from the remainder of the chicken necks.

12. The combination of claim 11 including means defining a plurality of longitudinal slots in the inner peripheral wall of the hollow cylinder and extending to the grooves to communicate therewith for the passage of fat through the grooves into the hollow cylinder; an auger housed within the cylinder to scrape the fat from said inner peripheral wall and feed it longitudinally of the cylinder; and an end wall of the cylinder having an opening for the discharge of the fat.

13. The combination of claim 11 in which the cylinder is about 3 feet long; the grooves have a width in the range of 1¼ to 1½ inches and a depth in the range of to ¼ inch; and said grooves are disposed along the entire length of the channel.

* * * * *

UNITED STATES PATENT OFFICE
CERTIFICATE OF CORRECTION

PATENT NO. : 3,913,174
DATED : October 21, 1975
INVENTOR(S) : Stephen A. Paoli

It is certified that error appears in the above-identified patent and that said Letters Patent are hereby corrected as shown below:

Claim 1, line 4, delete the semi-colon following "rotatable"

Claim 8, line 5, "and", first occurance, should be -- end --

Claim 11, line 33 (Column 8, line 1), "inlet-forming" should be -- inlet-facing --

Claim 13, line 4, before "to", insert -- 1/8 --

Signed and Sealed this twentieth Day of January 1976

[SEAL]

Attest:

RUTH C. MASON
Attesting Officer

C. MARSHALL DANN
Commissioner of Patents and Trademarks